(12) United States Patent
Wanink et al.

(10) Patent No.: US 8,840,367 B2
(45) Date of Patent: Sep. 23, 2014

(54) SYSTEM AND METHOD FOR COLLECTING PARTICLES IN A WIND TURBINE ROTOR BLADE

(75) Inventors: Joerg Wanink, Nordhorn (DE); Thorsten Honekamp, Emlichheim (DE)

(73) Assignee: General Electric Company, Schenectady, NY (US)

( * ) Notice: Subject to any disclaimer, the term of this patent is extended or adjusted under 35 U.S.C. 154(b) by 39 days.

(21) Appl. No.: 13/013,933

(22) Filed: Jan. 26, 2011

(65) Prior Publication Data

US 2011/0223019 A1 Sep. 15, 2011

(51) Int. Cl.
*F03D 11/00* (2006.01)

(52) U.S. Cl.
CPC .............. *F03D 11/00* (2013.01); *Y02E 10/721* (2013.01); *Y02E 10/722* (2013.01); *F03D 11/0016* (2013.01); *F05B 2240/30* (2013.01)
USPC .............................................. 416/1; 416/224

(58) Field of Classification Search
USPC ........................ 416/1, 146 R, 224, 232, 241 R
See application file for complete search history.

(56) References Cited

U.S. PATENT DOCUMENTS

| | | | |
|---|---|---|---|
| 6,354,285 B1 * | 3/2002 | Licht et al. | 125/13.01 |
| 6,749,670 B2 * | 6/2004 | Giles et al. | 96/74 |
| 7,607,894 B2 * | 10/2009 | Mustaros et al. | 416/231 R |
| 2009/0035148 A1 * | 2/2009 | Livingston et al. | 416/232 |
| 2009/0232658 A1 * | 9/2009 | Gerber et al. | 416/229 R |
| 2009/0297352 A1 * | 12/2009 | Walter | 416/223 R |
| 2010/0260603 A1 * | 10/2010 | Dawson et al. | 416/87 |

* cited by examiner

*Primary Examiner* — Edward Look
*Assistant Examiner* — Sean J Younger
(74) *Attorney, Agent, or Firm* — Global Patent Operation; Douglas D. Zhang

(57) ABSTRACT

A particle trap for collecting loose particles includes a container having an enclosure and at least one opening, and a feed hopper, wherein the feed hopper is connected to the at least one opening of the container, and wherein the particle trap is adapted for collecting particles moving in a direction of an opening of the feed hopper. Further, a method for collecting particles inside a wind turbine rotor blade is disclosed.

16 Claims, 6 Drawing Sheets

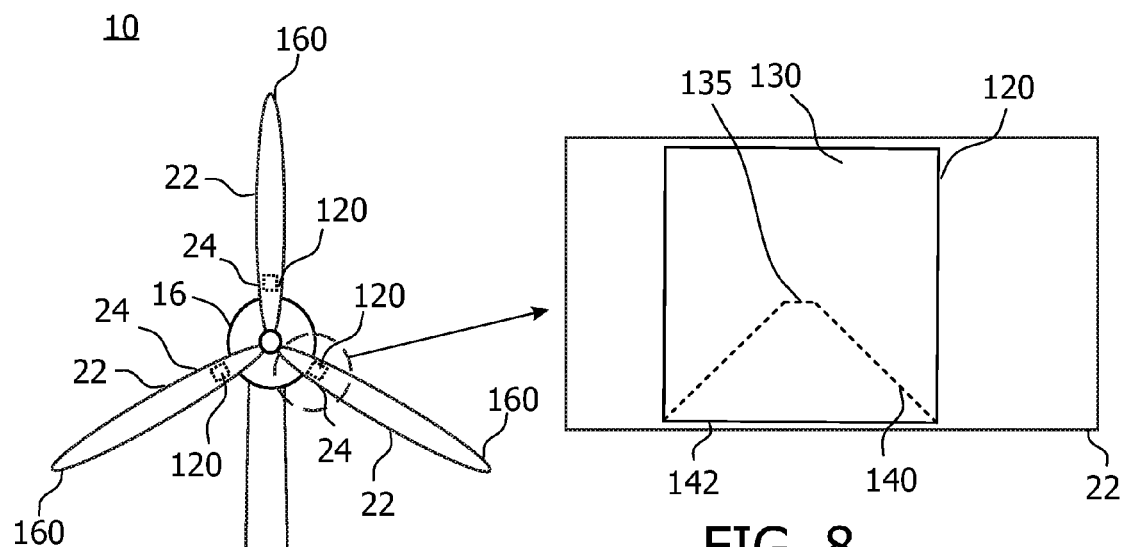
FIG. 8
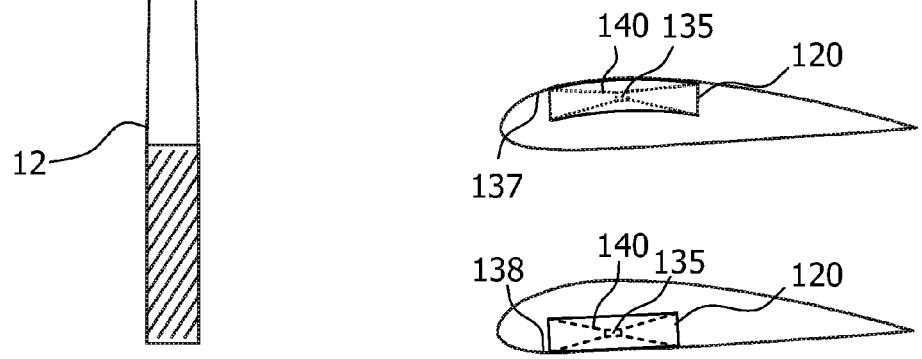
FIG. 9
FIG. 7

SYSTEM AND METHOD FOR COLLECTING PARTICLES IN A WIND TURBINE ROTOR BLADE

BACKGROUND OF THE INVENTION

The subject matter described herein relates generally to methods and systems for the maintenance of wind turbines, and more particularly, to methods and systems for avoiding sounds from loose particles moving around freely in the interior of wind turbine rotor blades.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

The blades are generally hollow, their bodies include laminates including glass fibre and resin. Typically, two halves are laminated together during the manufacturing process of a rotor blade. After the rotor blade is produced by joining the two halves, on the inside of the blade some fibers of the laminate may stick out of the inner surface or the like. During subsequent operation of the wind turbine, as the blade is subject to changing loads resulting in slight deformation of its body, fibers and particles may become loose. As a result, after some time a number of loose particles may build up in the interior of the blade. These particles have typical sizes from about 0.2 cm to 4 cm.

This is undesirable, as they move around during operation of the turbine, or even during idle operation of the turbine, when the blades are in a feathered position. This may lead to damage if e.g., bigger pieces hit a sensor inside the rotor blade. A further disadvantage is that once a certain number of particles are moving inside the blade, the sound of the particles sliding along the interior of the blade is audible outside the turbine as a kind of noise. Though this is only audible during idle or standstill of the turbine, as during operation there are many louder sound sources, it is still not desirable. For instance, persons not informed about the cause of the sound may tend to think that there is a malfunction in the turbine.

In view of the above, it is desirable to have a method and system for avoiding the sounds caused by loose particles inside rotor blades.

BRIEF DESCRIPTION OF THE INVENTION

In one aspect, a particle trap for collecting loose particles in a rotor blade is provided. The particle trap includes a container having an enclosure and at least one opening, and a feed hopper, wherein the feed hopper is connected to the at least one opening of the container, and wherein the particle trap is adapted for collecting particles moving in a direction of an opening of the feed hopper.

In another aspect, a wind turbine is provided. The turbine includes a tower, a nacelle, a rotor having at least one rotor blade, and at least one particle trap located inside the at least one rotor blade, wherein the particle trap includes at least one container having at least one opening.

In yet another aspect, a method of collecting particles inside a wind turbine rotor blade is provided. The method includes providing a container inside the wind turbine rotor blade, having at least one opening; and turning the wind turbine rotor.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein:

FIG. 7 is a view of a wind turbine with three particle traps, according to embodiments.

FIG. 8 is a sectional view of the wind turbine rotor blade of the wind turbine of FIG. 7.

FIG. 9 is another cross sectional view of the wind turbine rotor blade of FIG. 7.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a particle trap, a wind turbine system and a method that enable the collection of loose particles inside a rotor blade.

As used herein, the term "particle" is intended to representative of any element which does not have a structural connection to any part of the rotor blade, and which moves freely inside the blade. Particles are not limited to any kind of material, and not limited to a certain origin or source. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
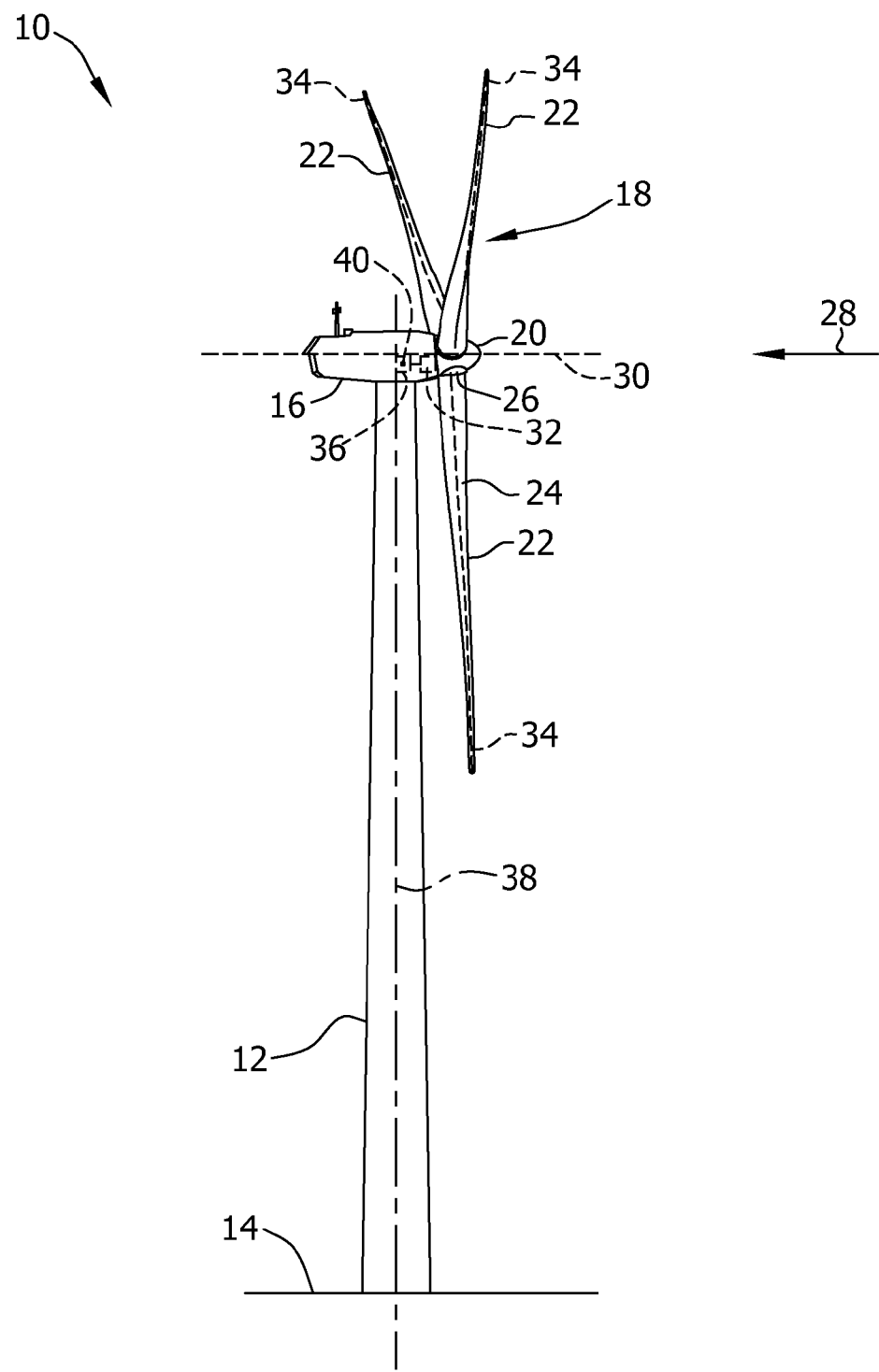
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
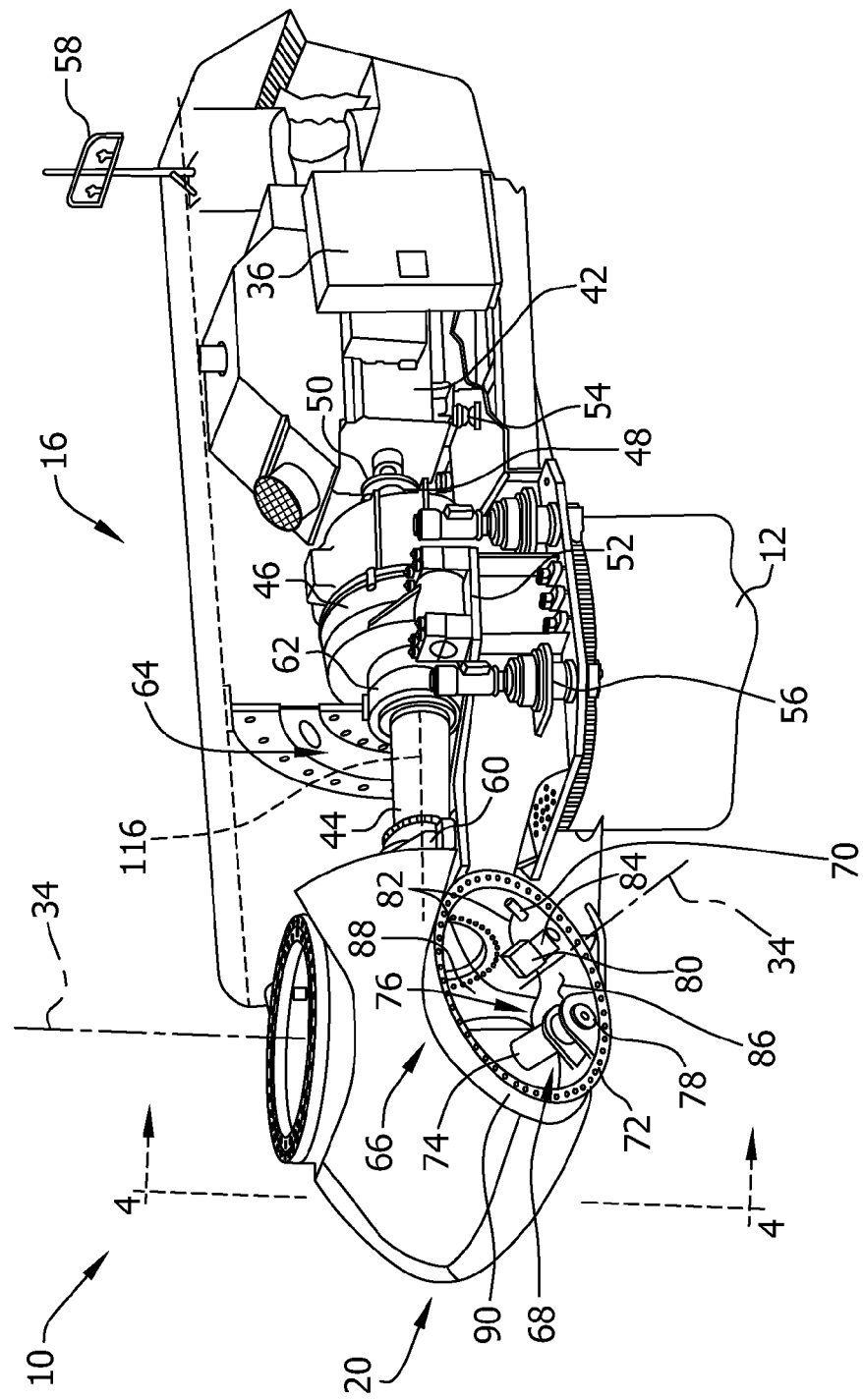
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

Figure 3:
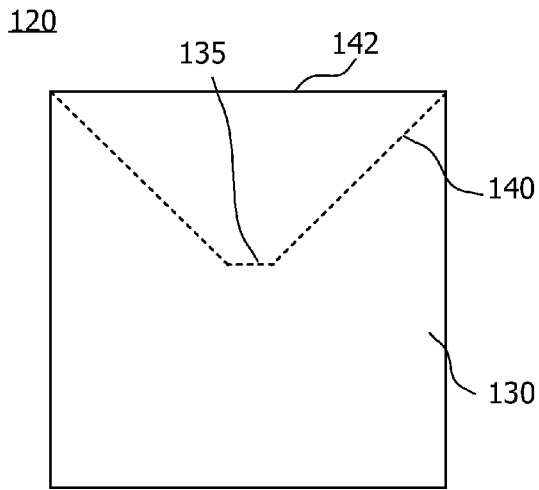
FIGS. 3 to 6 are different views of a particle trap according to embodiments.

FIG. 3 shows a side view of a particle trap 120 according to embodiments. The trap includes a container 130 having an opening 135. Formed into container 130 is a feed hopper 140, typically forming a part of the container. Typically, the container has the basic shape of a cuboid, wherein one side face of the cuboid is replaced by the larger opening 142 of feed hopper 140, whereas the smaller opening of the feed hopper is typically identical with the opening 135 of the container.

Figure 4:
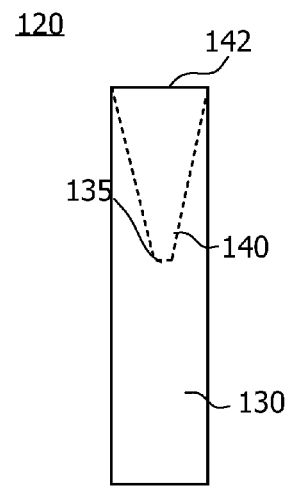
Figure 5:
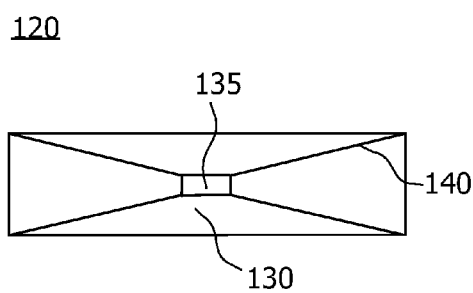

FIG. 4 shows a cross-sectional side view of particle trap 120 of FIG. 3. FIG. 5 shows a top view of the particle trap 120 of FIG. 3.

In embodiments, the particle trap 120 includes cardboard or a polymer, for instance, polyethylene, PET, polyester, combinations thereof, or a similar material. Also fibre/resin materials are suitable, like glass fibre or carbon fibre compound. There are no particular restrictions on the material in terms of structural features, as long as the trap may be formed from it to be stable enough to carry its own weight in any direction while being mounted at one face, without being deformed.

Figure 6:
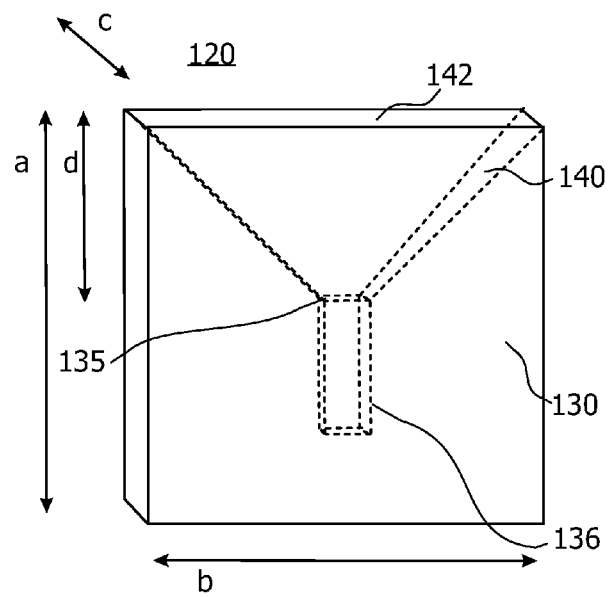

FIG. 6 is a perspective view of the particle trap 120 of FIG. 3 according to embodiments, with an additional tube section 136 connected to the opening 135. The tube section may further improve the trapping capabilities. In FIG. 6, typical dimensions of an embodiment of a particle trap are marked as a, b, c, and d. The dimensions are strongly dependent on the size of the wind turbine in which the trap is employed, and more specifically on the dimensions, shape and inner structure of the rotor blades. Exemplary ranges for wind turbines with a power output from 1.5 to 3 MW are: Dimensions a and b from 1 m to 3 m, more typically from 1.5 m to 2.5 m; dimension c from 0.15 m to 0.8 m, more typically from 0.2 m to 0.5 m. The area of opening 135 of the feed hopper may have a size from 0.005 $m^2$ up to 0.2 $m^2$, more typically from 0.01 $m^2$ to 0.1 $m^2$. The opening typically has a rectangular, square or round shape; also other forms of the opening 135 are possible. Dimension d is the distance between opening 135 and the larger opening 142 of the feed hopper. Dimension d may be from 0.5 m to 2.8 m, more typically from 1.2 m to 2 m.

According to embodiments, the particle trap is typically located inside a rotor blade 22 of a wind turbine 10, as shown in FIG. 7. In the embodiment, three traps 120 are located in a root portion 24 of a rotor blade 22 each. Typically, the larger openings 142 of the feed hoppers 140 are directed in a direction of the tip portions 160 of the rotor blades 22. For illustrational purposes, the rotor blades 22 in FIG. 7 are shown in a position where the pitch angle has a maximum. For the collection of particles according to embodiments, the rotor blades are typically, but not necessarily, positioned differently, typically in a feathered position, which is laid out further below.

Generally, particle traps 120 according to embodiments may be positioned at any position inside the rotor blade 22, and the opening 142 may be directed into a variety of directions, for instance, facing towards the tip region of the blade, towards the root portion, or in an oblique angle with respect to the longitudinal axis of the blade. If the trap is positioned close to a root portion, the accessibility for maintenance is optimal. In case of maintenance, the trap may be cleaned of particles by service personnel, e.g. using a type of vacuum cleaner. For this purpose, an extra opening may be provided in the container section.

FIG. 8 is a cross sectional view through rotor blade 22. FIG. 9 shows another cross-sectional view of the rotor blade 22 and the trap 120. The larger opening 142 of the feed hopper 140 is typically replacing one of the side faces of the container 130. In other embodiments (not shown), the feed hopper may be formed as a device separate from the container, and its smaller opening may be connected to an opening in a side face of container 130.

As can be seen in FIG. 9, which shows two cross sectional views of the root portion 150 of embodiments of the wind turbine of FIG. 7, the particle trap is mounted to one of the inner faces of the rotor blade 22. In the upper part of FIG. 9, it is mounted to an inner face 137, and in the lower part of FIG. 9 it is mounted to an inner face 138. Both options may be applied, they may even be combined in one rotor blade. The container 130 of trap 120, which is basically a cuboid, can be mounted to an inner face 137, 138 of the blade 22 by any suitable method such as gluing, laminating, using screws, or other fixation methods known to the skilled person. The container 130, respectively trap 120, may be produced to have a certain curvature in order to be able to be seamlessly mounted to the inner face of blade 22. In other embodiments not shown, the trap may also be located at other positions inside the rotor blade, for instance at the inner faces close to or at the trailing edge or the leading edge. In these cases, the form of the container has to be adapted due to the limitations of available space in those regions of the blade.

If the particle trap is typically formed as a cuboid having straight sides without any curvature, the material should provide enough flexibility, so that the particle trap may be slightly deformed during mounting, so that the face of the particle trap 130 contacting the inner face of the blade may be seamlessly connected such as shown in the upper part of FIG. 9. If the particle trap is formed from cardboard, for instance, a thickness of the material of 1 to 3 mm may provide for enough flexibility of the trap.

To determine the best type and thickness of the material in terms of both stability of the trap and flexibility for mounting, the properties of the material, the dimensions of the trap and the curvature of the inner ace of the blade should be taken into account, which is a standard task for a skilled person. The appropriate outer dimensions of the particle traps according to embodiments are strongly dependent on the dimensions of the wind turbine rotor blades in which they are applied. Suitable dimensions will be easily derived by the skilled person from the illustrations provided and this description. Further, depending on the individual use case, the form of the particle trap may have to be modified from the examples described, for instance when taking into account particular geometrical limitations by structural elements inside a rotor blade, FIG. 10 shows a wind turbine 10 according to embodiments, having two particle traps 120 located in each rotor blade 22. One trap is positioned in the root section 150 and one trap is located in the tip section 160 of each blade 22. The two detailed sectional views on the right of FIG. 10 show the trap 120 in the root section 24 (above) and the trap 120 in the tip section 160 (below). As can be seen in the detailed sectional views, the larger openings 142 of the feed hoppers 140 are each directed to the respective other end section of the rotor blade 22.

FIGS. 11 to 13 show partial views (only one rotor blade for illustrational purposes) of a wind turbine rotor having a rotatable hub 20 and a rotor blade 22 mounted thereto. The rotor blade is shown in different rotational angles about the rotational axis of hub 20, illustrating the different positions of a rotor blade when the rotor of a wind turbine 10 according to embodiments is turned. The rotor blade is typically in a feathered position, which complies to the typical pitch angle during idle or standstill of the wind turbine. When the particle trap 120 is located inside rotor blade 22 as shown before, the feathered position of the blades is typically the most appropriate position for the trap to work as described. The wind turbine is, in this particular case, in idle mode and typically does not produce electricity. The rotor is turned at a slow rate by the wind, for instance at 0.1 to 1.5 rotations per minute, because the rotor blades in a feathered (idle) position do not exert a significant torque. Hence, in the embodiments described, the rotor moves significantly slower than during normal operation of the turbine and the blades are in a feathered position.

Figure 11:
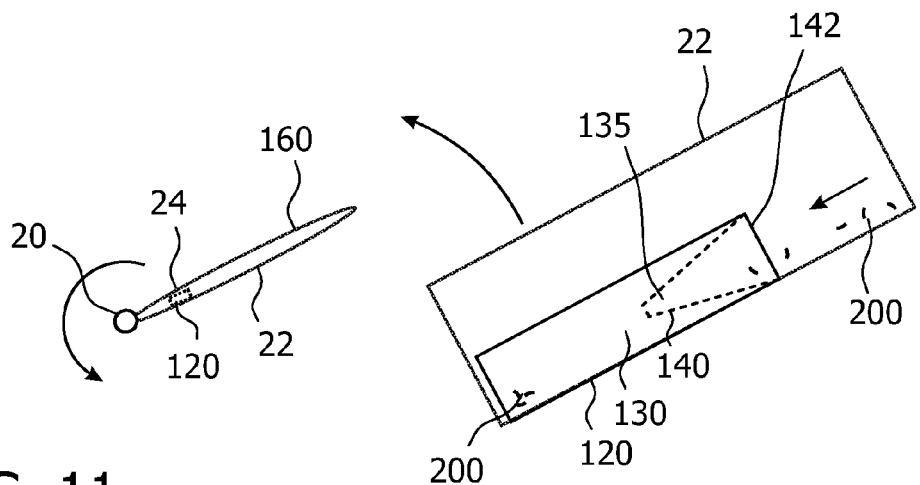
FIGS. 11 to 13 are schematic views of a wind turbine rotor according to embodiments.
Figure 12:
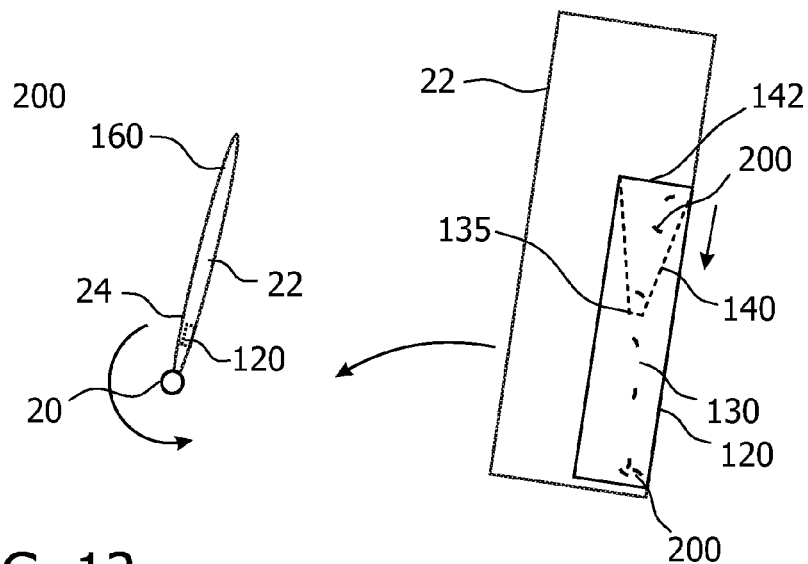
Figure 13:
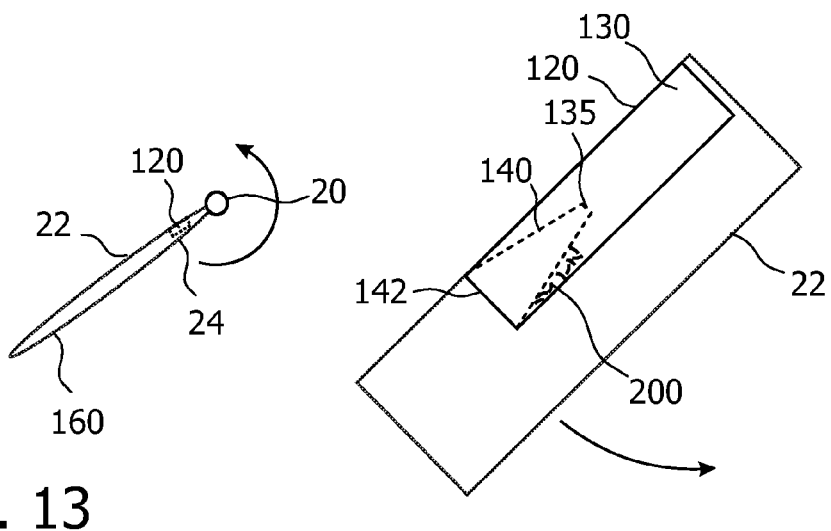

In other embodiments, particularly if the trap is/are located at different positions than shown in FIGS. 11 to 13, other pitch angles of the blades may allow collection of particles with the traps 120 as well. For instance, if a trap is located close to a trailing edge in the rotor blade 22, particles may also be collected during normal operation of the wind turbine, i.e., when the rotor blades have a pitch angle significantly different from the pitch angle according to a feathered position.

In FIG. 11, the rotor blade is moving upwards. As can be seen in the sectional view of the rotor blade 22 at root section 24, particles 200 moving around freely inside rotor blade 22 are sliding/moving through gravitational forces in a direction to the larger opening 142 of the feed hopper 140 of particle trap 120. As shown, two particles are already inside feed hopper 140, where they are guided by the faces of the feed hopper in a direction of the opening 135 of the container 130 of trap 120.

In FIG. 12, the rotor has proceeded further in its rotational movement, and the rotor blade 22 is almost vertical. The sectional view on the right shows how particles 200 are ailing into container 130 of trap 120. Some particles have already passed opening 135, some have fallen down to the lowest face (with respect to a ground level) of the container 130.

FIG. 13 shows a further advanced position of rotor blade 22 during the turning of the rotor. All particles 200 shown in previous FIGS. 11 and 12 are collected in the container 130 of trap 120. As the rotor has advanced and the larger opening 142 of the teed hopper 140 is now facing left/downwards, the particles 200 have slid along inner faces of the container 130, whereby they did not pass the opening 135. As is obvious, when the rotor proceeds in turning from the position shown in FIG. 13, the particles 200 will slide along the inner faces of container 130 of trap 120, but will not fall out through opening 135. Thus, they are trapped inside particle trap 120 and are no longer able to move around along the inside of rotor blade 22, where they could cause noise or even damage.

Figure 10:
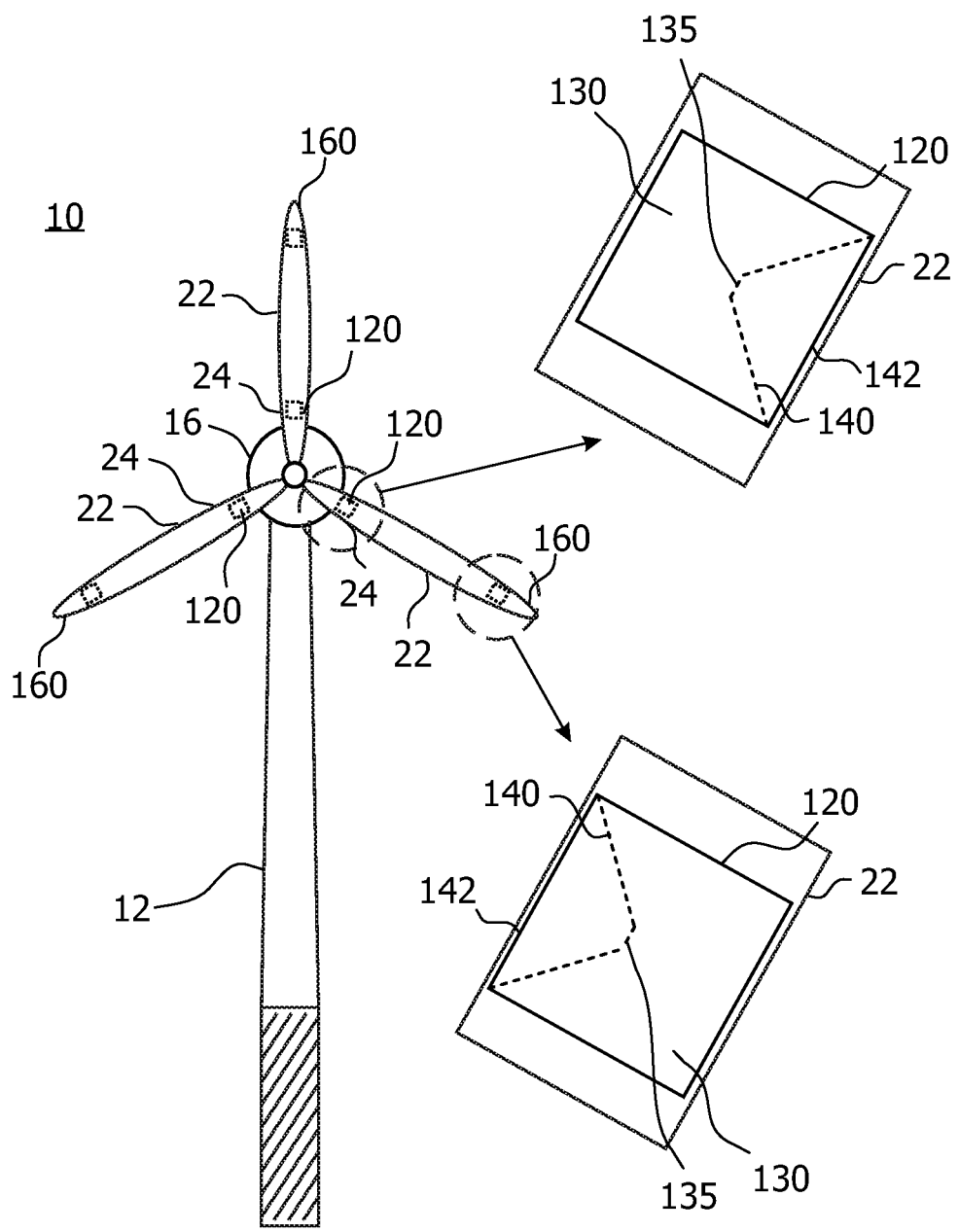
FIG. 10 is a view of a wind turbine according to embodiments, including two detailed sectional views.

If the particle trap is designed for the trapping of particles during normal operation of the wind turbine, the above described process may be influenced by centripetal forces acting on the particles due to faster movement of the rotor. In this case, it may be appropriate to add a second particle trap 120 in each rotor blade, located in the tip section 160, as shown in FIG. 10.

The above-described systems and methods facilitate to collect freely moving particles from the inside of wind turbine rotor blades. More specifically, they prevent freely moving particles from causing noise and/or damage.

Exemplary embodiments of systems and methods for particle traps for collecting loose particles in wind turbines are described above in detail. The systems and methods are not limited to the specific embodiments described herein, but rather, components of the systems and/or steps of the methods may be utilized independently and separately from other components and/or steps described herein. For example, they may be used in other cavities which need to be cleaned of loose particles, and are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine comprising:
   a tower;
   a nacelle;
   a rotor having at least one rotor blade; and
   a particle trap located inside the at least one rotor blade, wherein the particle trap comprises:
      a container comprising an enclosure and an opening, wherein the container is separate from the at least one rotor blade and is mounted to the at least one rotor blade; and
      a feed hopper,
      wherein:
         the feed hopper is connected to the opening of the container,
         the particle trap is configured to collect particles moving in a direction of an opening of the feed hopper, and
         a cross sectional area of the container where the opening of the container is located is substantially smaller than a corresponding cross sectional area of the at least one rotor blade, wherein the cross sectional area and the corresponding cross sectional area of the at least one rotor blade are on a same plane.

2. The wind turbine of claim 1, wherein the container is mounted to at least one inner face of the rotor blade.

3. The wind turbine of claim 1, wherein the container is located in a root portion or a tip portion of the rotor blade.

4. The wind turbine of claim 1, wherein the opening of the container is located in an end portion of the rotor blade faces towards the opposite end portion of the rotor blade.

5. The wind turbine of claim 1, wherein the feed hopper has a wider opening and a smaller opening, and wherein the smaller opening is connected to a tube disposed inside the container, the tube having substantially the same diameter as the smaller opening.

6. The wind turbine of claim 5, wherein the feed hopper comprises a wider opening and a smaller opening, the smaller opening forming the opening of the container.

7. The wind turbine of claim 1, wherein the container comprises cardboard, a polymer, a fiber compound material, or combinations thereof.

8. The wind turbine of claim 1, wherein the container is a cuboid.

9. The wind turbine of claim 5, wherein at least one side face of the container is at least partly replaced by the wider opening of the feed hopper.

10. The wind turbine of claim 1, comprising more than one particle traps per rotor blade.

11. A method of collecting particles inside a wind turbine rotor blade, comprising:
providing a particle trap inside the wind turbine rotor blade, the particle trap comprising a container comprising an enclosure and an opening, wherein the container is separate from the wind turbine rotor blade and is mounted to the wind turbine rotor blade, and a feed hopper connected to the opening of the container, wherein a cross sectional area of the container where the opening of the container is located is substantially smaller than a corresponding cross sectional area of the at least one rotor blade, wherein the cross sectional area and the corresponding cross sectional area of the at least one rotor blade are on a same plane, and wherein the particle trap is configured to collect particles moving in a direction of an opening of the feed hopper; and
turning the wind turbine rotor blade.

12. The method of claim 11, wherein particles moving inside the wind turbine rotor blade are moving through the opening into the container.

13. The method of claim 11, wherein the particles are moved by gravitational forces and kinetic forces caused by the rotational movement of the wind turbine rotor blade.

14. The method of claim 11, wherein particles are directed in the direction of the opening in the container by faces of the container which form the feed hopper.

15. The wind turbine of claim 1, wherein the particle trap is configured to prevent the particles from causing noise and/or damage to the at least one rotor blade.

16. The wind turbine of claim 1, wherein the particle trap is configured to prevent the particles from causing noise and/or damage to the at least one rotor blade.

* * * * *